United States Patent [19]

Hubbard et al.

[11] Patent Number: 5,456,146
[45] Date of Patent: Oct. 10, 1995

[54] BAR STOCK PREALIGNMENT COLLAR

[75] Inventors: Bradley C. Hubbard, New Albany; John R. Riley, Lanesville, both of Ind.

[73] Assignee: MKM Machine Tool Co., Inc., Clarksville, Ind.

[21] Appl. No.: 145,075

[22] Filed: Oct. 29, 1993

[51] Int. Cl.$^6$ ............................................. B23B 13/12
[52] U.S. Cl. ............................ 82/127; 82/163; 279/133
[58] Field of Search ............................... 82/124–127, 163, 82/170; 279/133

[56] References Cited

U.S. PATENT DOCUMENTS

| 2,759,735 | 8/1956 | Cross ................................. 82/127 |
| 2,779,040 | 1/1957 | Scarff . |
| 3,525,277 | 8/1970 | Jeanpretre et al. .............. 82/127 |
| 4,130,035 | 12/1978 | Langley ........................... 82/163 |
| 4,346,945 | 8/1982 | Tsuboi . |
| 4,746,131 | 5/1988 | Mathes . |
| 4,788,895 | 12/1988 | Spooner . |
| 5,058,466 | 11/1991 | Fabbri . |

FOREIGN PATENT DOCUMENTS

| 0286010 | 10/1988 | European Pat. Off. ............... 82/124 |
| 1060318 | 12/1983 | U.S.S.R. ............................. 82/163 |
| 1065137 | 1/1984 | U.S.S.R. ............................. 82/125 |
| 1452606 | 10/1976 | United Kingdom ................ 82/127 |

OTHER PUBLICATIONS

Jergens Tooling Components Catalogue, pp. 108–109, Jergens, Inc., Cleveland, Ohio.

Primary Examiner—Steven C. Bishop
Attorney, Agent, or Firm—Middleton & Reutlinger; David W. Carrithers

[57] ABSTRACT

An apparatus for prealigning hex or square stock sections before chucking in a collet. As hex stock advances, prealignment bushing provides general alignment. A plurality of spring-loaded veliers positioned within the prealignment collar slidably contact the flats of the stock along the path of travel and urges the stock radially to the proper alignment, so that the points of the stock do not hit the collet.

49 Claims, 3 Drawing Sheets

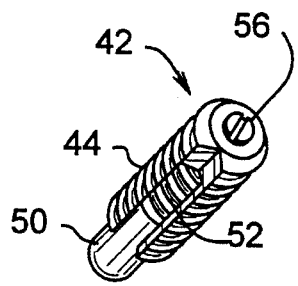 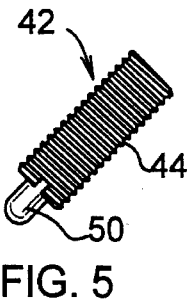 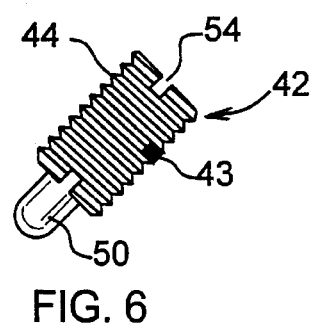
FIG. 4   FIG. 5   FIG. 6
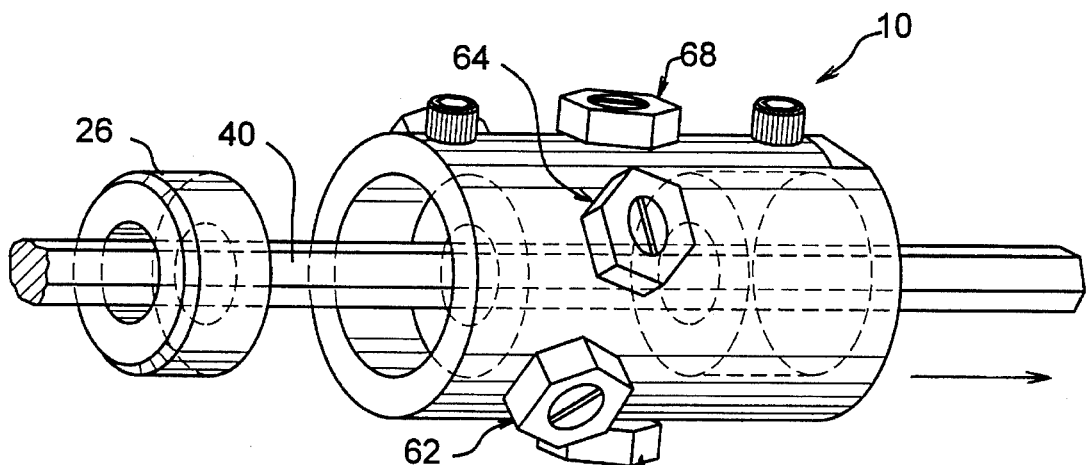
FIG. 7

BAR STOCK PREALIGNMENT COLLAR

BACKGROUND OF THE INVENTION

The present invention relates to an apparatus having a plurality of self-adjusting support and biasing members for supporting and prealigning polygonal and other cross-sectional shaped bars such as hex or square stock bar sections or stock having different diameters before chucking in the collet of machine tools so that the operation performed on the work piece can be efficiently carried out.

Many automatic and manual machine tools are of the type in which the feed material is a metal bar, or bar stock, of a length considerably greater than the parts to be produced from it, wherein the stock is typically in 12 to 16 foot sections. Since the manufacturing operation takes place at one end of the bar stock while it is rotating clamped in a chuck mechanism, it is necessary that the entire length of stock rotate. Generally, the stock is fed to the chuck through a cylindrical spindle in the headstock of the machine tool at rates of about 1,200 to 1,500 feet per hour, wherein the inside diameter of the spindle is sized to closely fit the outside diameter of the largest bar stock to be used, typically about ¾ of an inch in diameter. However, the diameter can vary greatly and it is not practical to change headstocks when bar stock of other diameters or polygonal shaped bar stock is used.

When smaller bar stock is held in the chuck mechanism and rotated, the bar stock within the spindle tends to move out of concentric rotation and the resulting movement can cause poor surface finish on the machined parts and problems associated with the control of the machining operation. Commercially available control guides fail to correct the problem caused by nonuniformity in the size or cross-sectional shape of the bar stock.

Most machine tool operations also include a bar feeding and/or support device such as an automatic bar-loader for holding one or more bars within a tubular trough or guide and utilizing a bar pushing device to push and guide the bar stock in position so that the inlet end of the headstock is in position for insertion in the collet of the chuck. In order to allow insertion of the shaped bar within the chuck, the profile of the bar and that of the collet must coincide during insertion. Even if the chuck is rotating, the bar in fact fails to enter the collet, since it is forcefully pushed against the noncomplementary surface and it too is rotated, preserving an angular offset. On the other hand, even if the bar is not rotated, the moment during which it is in step with the collet is very short, and insertion is impossible since the advancement system has considerable inertia.

Accordingly, it is a principal object of the present invention to provide a self-adjusting bar stock support to minimize undesirable radial or lateral motion of the bar stock.

It is another object of the present invention to provide a self-adjusting bar stock support which can accommodate different diameters and bar stock of different transverse cross-sectional shapes, and bar stock having nonuniformities, all with one size support.

It is another object of the present invention to provide a self-adjusting bar stock support which is economical and of simple manufacture.

It is therefore another object of the present invention to solve the above described problem by providing a prealignment device capable of aligning the bar stock with the collet of a chuck.

It is an object of the present invention to provide an adjustable means responsive to angular displacement of the bar stock to restore the normal longitudinal position of the tool for proper alignment within the collet.

Another object is to provide a means of prealignment of bar stock which is easily installed in a working position and easily disconnected therefrom, convenient in use, economical of manufacture, simple to construct, and easy to service.

SUMMARY OF THE INVENTION

The present invention achieves the above objects by providing a bar stock support and prealignment collar comprising a biasing means comprising a plurality of veliers extending through a cylindrical tube or collar at selected positions toward the central axis of the collar for radially urging and guiding the stock in alignment with the collet.

More particularly, the bar stock prealignment collar of the present invention comprises a tubular member having a longitudinal bore therethrough including a counterbore on each end, and includes an adjustable biasing means comprising at least two spring loaded plungers or veliers extending through the tubular member radially inwardly toward the center of the bore. A means for holding the biasing means in cooperative engagement within the tubular member is provided in the form of at least one set screw which extends through a counterbore end section in cooperative engagement with a support structure. Moreover, the biasing means has sufficient resistance when deformed to rotatably urge and support a longitudinal section of bar stock having at least two flat sides in concentric alignment in a desired orientation within the bore.

As bar feeding device advances the hex stock, a prealignment bushing provides general alignment of the bar stock with a prealignment collar. The prealignment bushing may be inserted into a counterbore within the tubular body of the prealignment collar or mounted exterior and anterior to the prealignment collar; however, the prealignment bushing is not necessary with bar stocks having similar diameters. A bar stock of any shape and within a wide range of dimensions advance through the prealignment collar contacts and depresses a plurality of spring-loaded veliers positioned within the prealignment collar, wherein the points of the bar stock sections contact the plungers of the veliers along the path of travel, whereby the plungers deflect and rotatably urge the stock radially in to the proper alignment, so that the end points and edges of the stock sections are aligned properly within the chuck of the collet. The prealignment collar may be used in the spindle of a machine tool for bar stock support and guide member, in a pneumatic bar stock feeder, or for any application where it is necessary to support and alignment means of stock of varying shapes and diameters.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 4 is a perspective view of a spring loaded velier;

FIG. 5 is a side view of the spring loaded velier of FIG. 4;

FIG. 6 is a side view of a shorter spring loaded velier;

FIG. 7 is an exploded perspective view of the prealignment collar of FIG. 2, showing the prealignment bushing and showing in phantom lines the points of contact of the veliers with the hex bar stock;

SPECIFICATION

The prealignment collar of the present invention is manufactured from readily available materials and simple in design. The preferred embodiment is comprised of metal, more particularly steel; however, it is contemplated that plastic or other polymer composite materials could be used in combination with or substituted for the steel components of the present invention.

Figure 1:
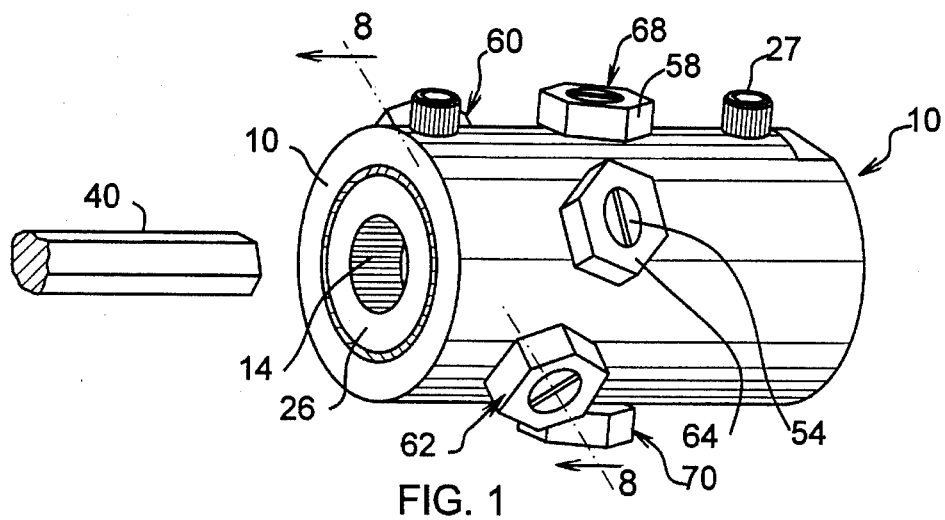
FIG. 1 is a perspective view of the prealignment collar of the present invention before insertion of the hex bar stock.
Figure 2:
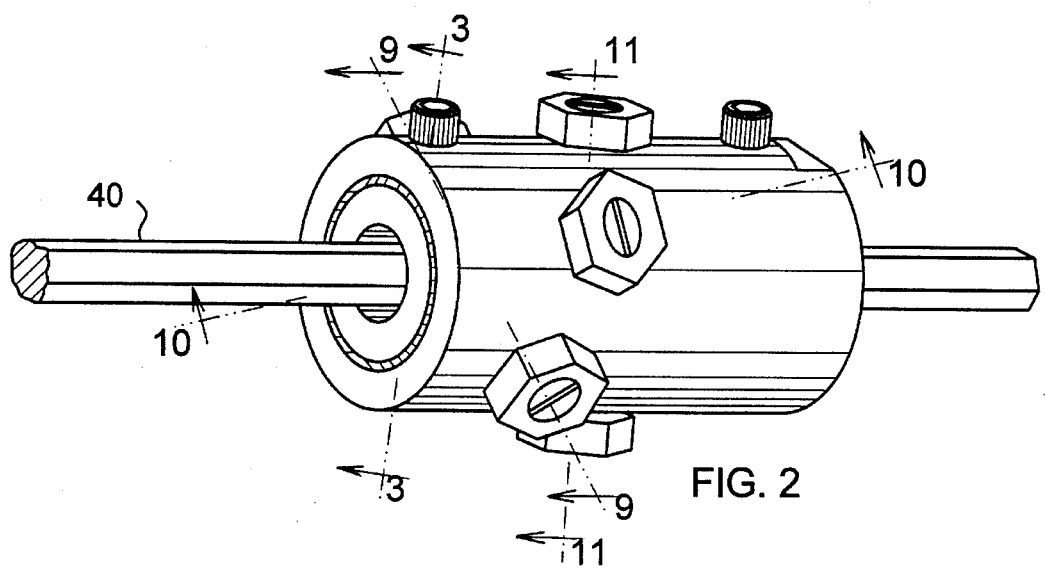
FIG. 2 is a perspective view of the prealignment collar of the present invention after insertion of the hex bar stock.
Figure 3:
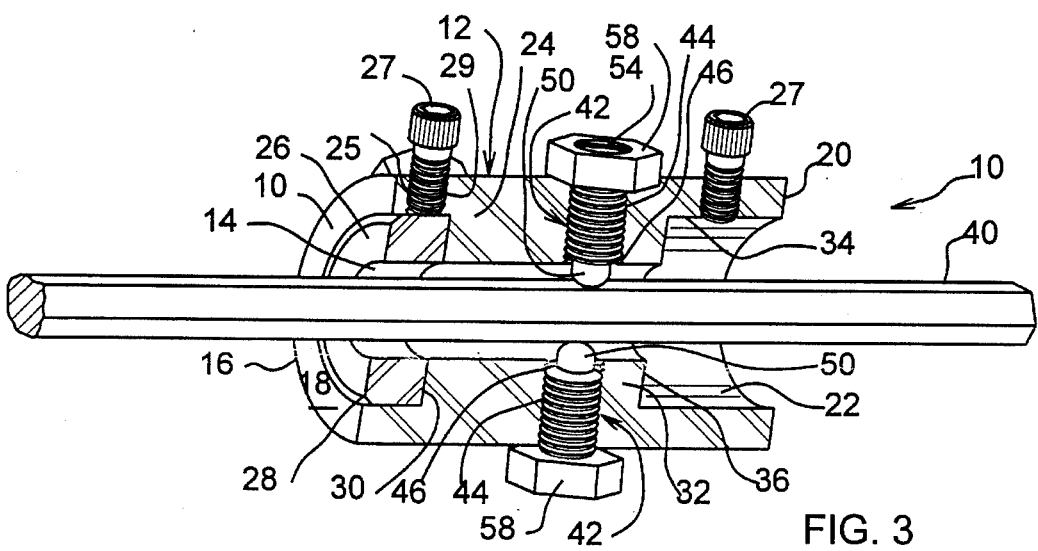
FIG. 3 is a longitudinal sectional view of the prealignment collar taken along line 3—3 of FIG. 2 showing the insertion of the hex bar stock within the collar with a pair of spring loaded velier plungers in contact with the hex bar stock radially aligning the bar stock.

Referring now to the drawings, FIGS. 1–3, and 7 show the bar stock prealignment collar 10. As best shown in FIG. 3, the prealignment collar includes a main tubular body portion 12 having a generally cylindrical external surface and having a centrally located bore 14 extending through the longitudinal axis. The bore 14 may include a plurality of axially extending, generally cylindrical sections of various diameters such as are shown in FIG. 3. The shape of the external surface of the body 12 may be modified or adapted to fit adjacent to or to be recessed within a particular machine. The tubular body 12 extends from a first stock receiving end 16 having a first generally radial end face 18 at one end of the body 12 to a second generally radial end face 20 at the opposite bar outlet end 22 of the body 12.

A first interior annular wall or counterbore 24 is recessed within the body 12 at a selected distance from the stock receiving end 16 sized and shaped to receive an annular prealignment bushing 26 which may be held into position by a friction fit, press fit, or at least one set screw 27 extending through the body 12 normal to the longitudinal axis pressed or having external threads 25 threadedly engaged with a threaded inner surface 29 formed within the tubular body 12 such as is shown in FIG. 3. The prealignment bushing 26 has an external surface complementary sized and shaped to fit into a first axially extending interior cylindrical section 28 of bore 14. The first cylindrical section 28 of the main body 12 has a larger diameter than the diameter of the bore 14 so that the a third generally radial end face 30 is formed at the intersection thereof to limit the axial movement of the bushing 26 held therein. The bushing 26 has an internal diameter greater than the diameter of the bore 14. The bushing is used to prealign the longitudinal section of bar stock 40 as the stock 40 enters the bore 14 of the prealignment collar 10. The prealignment collar may be used without a bushing 26, or it may use additional bushings 26 held into position anterior to and exterior to the prealignment collar 10. It is contemplated that the interior diameter of the bushing 26 may also be conically shaped to further aid in prealigning the rod 40 with the bore 14.

A second interior annular wall or counterbore 32 is recessed within the body 12 at a selected distance from the outlet end 22 forming a second interior cylindrical section 34 having a larger diameter than the diameter of the bore 14 so that the a fourth generally radial end face 36 is formed at the intersection thereof to limit the axial movement of a tubular holding means 38 (not shown) inserted therein. The tubular holding means 38 has an external surface complementary sized and shaped to fit into a second axially extending interior cylindrical section 34 of bore 14. The prealignment collar 10 may be held into position and fastened to the tubular holding means 38 by a friction fit, press fit, or at least one set screw 27 extending through the body 12 normal to the longitudinal axis pressed or threadedly engaged with a threaded inner surface 29 formed within the tubular body 12.

The first axially extending interior cylindrical section 28 is joined to the second axially extending interior cylindrical section 34 by the bore center section 15 of bore 14.

At least one pair of biasing means, more particularly, spring plungers or spring loaded veliers 42 having threaded outer surfaces 44 are spaced apart at selected positions extending radially inwardly from each end 16 and 22 extending through the exterior surface of the tubular body 12 and through the central bore section 15 normal to the longitudinal axis and pressed or threadedly engaged with a threaded inner surface 44 formed within the tubular body 12 such as is shown in FIG. 3.

As best shown in FIGS. 4–6, the veliers 42 are readily available and can be ordered in a variety of sizes, shapes, and lengths from various manufacturer's such as JERGENS, INC.'s, Jergen's Tooling Components. The veliers may also have nylon or other plastic types of locking elements 43 inserted within the threads for more secure fastening. In the preferred embodiment the shorter veliers 42 such as are shown in FIG. 6 are used to provide maximum control of the hexagonal stock. FIG. 4 shows a cut-away view of a typical spring loaded velier 42 showing a tubular body 42 having a threaded outer surface 44 and internal bore 48 having a rotatable and axially moveable hardened steel plunger 50 extending outward from the exterior of the body 42 forming the tip thereof, and having a portion of the plunger 50 retained within the bore 48 by a radial lip in cooperative engagement with the bore 48, a spring 52 in cooperative engagement with the end of the plunger 50 and the side walls of the velier bore 48, and a slot 54 or hex drive 56 formed in the head of the velier 42. The velier 42 is simply screwed into the prealignment collar 10 so that the plunger 50 extends into the central bore section 15 a selected distance for engagement with the stock 40 being aligned thereby. Furthermore, a locknut or tap 58 may be screwed onto the top portion of the velier threads 44 extending outward from the prealignment collar main body 12, and tightened to provide an additional means for controlling the depth that the velier 42 extends into the body 12, and depth that the plunger 50 extends into the central bore section 15. The tap 58 also aids in securing the velier 42 within the body 12 so that the velier 42 does not work loose during the machining operation.

Only one pair of veliers 42 radially spaced apart opposite one another may be used in a prealignment bushing; however, generally one velier 42 is used for each flat surface of the stock 40 depending on the number of surfaces on the polygonal shaped stock. As shown in FIGS. 7–11, six veliers 42 are utilized for maximum control of a six-sided hexagonal section of bar stock 40; however, even three veliers could be used with six, eight, or even nine sided stock 40 depending upon the radial position of the veliers 40. Upon obtaining the correct alignment with the veliers 42, stationary pins may be utilized at various positions within the prealignment collar 10 to hold the stock 40 in the correct rotational alignment.

Figure 10:
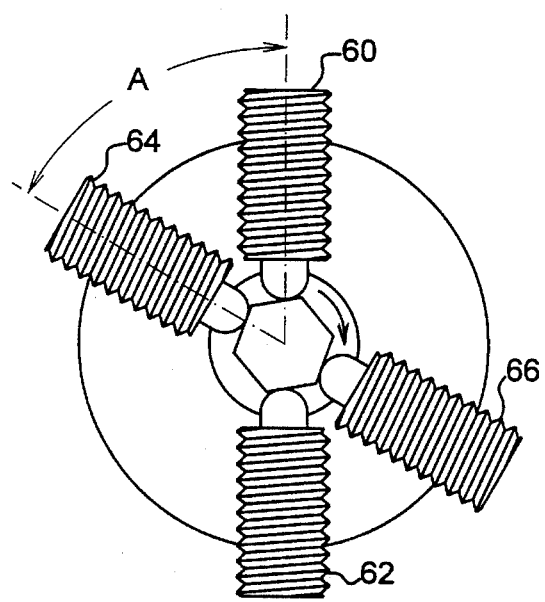
FIG. 10 is an end cross-sectional view of the prealignment collar of the present invention, taken along line 10—10 of FIG. 2, showing the first and second set of veliers having the plungers extending therefrom contacting the bar stock within the collar.
Figure 11:
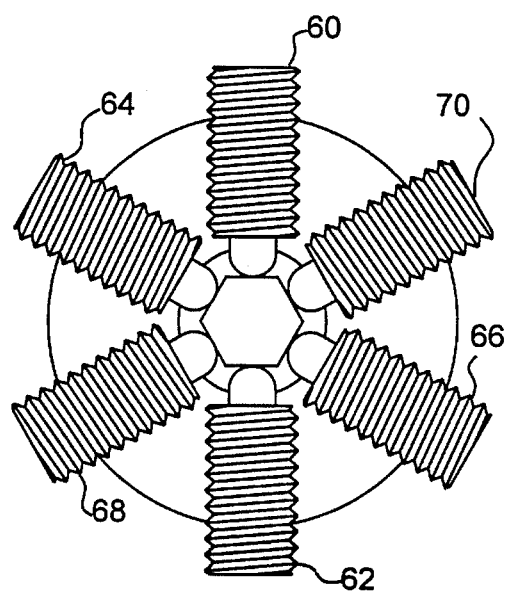
FIG. 11 is an end cross-sectional view of the prealignment collar of the present invention, taken along line 11—11 of FIG. 2, showing the first, second, and third set of veliers having the plungers extending therefrom contacting the bar stock within the collar.

As shown in the preferred embodiment, the each of the three pairs of veliers 42 are radially spaced apart opposite one another. Each set of veliers 42 are spaced apart from one another on the longitudinal axis about ½ inch apart and rotated radially counter-clockwise approximately 120 degrees as shown in FIG. 10 as Angle "A". Thus, the first set of veliers 60 and 62, are offset approximately 120 degrees from the second set of veliers 64 and 66 as shown in FIG. 10. Moreover, the third set of veliers 68 and 70 are offset counterclockwise 120 degrees from the second and third set of veliers, 60 and 62, and 64 and 66, respectively, as shown best in FIGS. 7 and 11.

Figure 8:
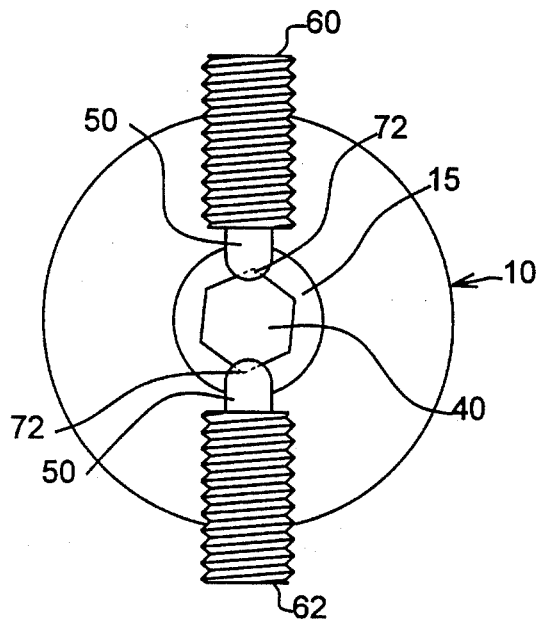
FIG. 8 is an end cross-sectional view of the prealignment collar of the present invention, taken along line 8—8 of FIG. 1, showing the first set of veliers having the plungers extending therefrom before insertion of the bar stock within the collar.
Figure 9:
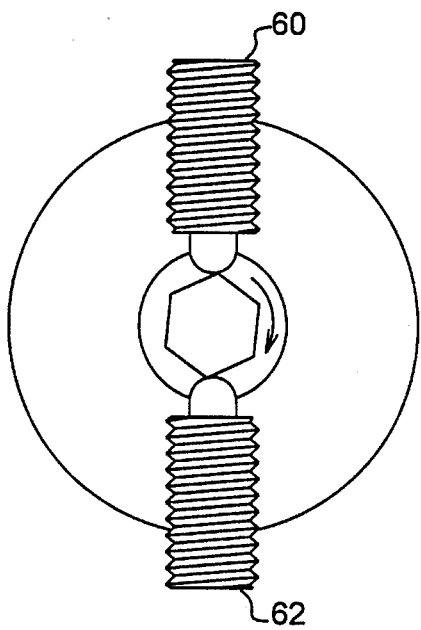
FIG. 9 is an end cross-sectional view of the prealignment collar of the present invention, taken along line 9—9 of FIG. 2, showing the first set of veliers having the plungers extending therefrom contacting the bar stock within the collar.

The method of aligning the stock 40 is best shown in reference to FIGS. 8–11. Before the stock enters central bore section 15 of the prealignment collar 10, the first set of veliers 60 and 62 are shown in FIG. 8 having the plungers 50 extending downward directly in the path of the stock 40. As shown in FIG. 8, the stock is not in axial alignment with the plungers 50 and the edges of the hexagonal stock forms points 72 on the ends of the stock 40 which will strike the plungers 50. As the stock 40 moves through the central bore section 15 of the prealignment collar 10, the points 72 of the stock 40 strike the tips of the plungers 50 of veliers 60 and 62, depressing the plungers 50 which deflect and rotatably urge and bias the stock 40 into axial alignment with the plungers 50 so that the plungers 50 contact the sides of the stock 40. As the stock 40 continues to move through the prealignment collar 10, the points and or side surface adjacent the points 72 strike the second set of veliers, 64 and 66, depressing the plungers, whereby the plungers 50 deflect and rotatably urge and bias the stock 40 into further rotational alignment with the veliers 42. Finally, the points 72 of the stock 40 strike the third set of veliers, 68 and 70, depressing the spring loaded plungers 50, whereby the plungers 50 deflect and rotatably urge and bias the stock 40 into further rotational alignment with the veliers 42 and in alignment with the collet of the chuck for machining.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A bar stock prealignment collar, comprising:

a tubular member having a longitudinal bore therethrough;

adjustable biasing means extending through said tubular member radially inwardly toward the center of said bore, said adjustable biasing means comprising at least a first pair and a second pair of spring loaded plungers radially and longitudinally spaced apart; and means for holding said biasing means in cooperative engagement within said tubular member, said biasing means having sufficient resistance when deformed to rotatably urge and support a longitudinal section of bar stock having at least two flat sides in concentric alignment in a desired orientation within said bore.

2. The bar stock prealignment collar of claim 1, wherein said means for holding said biasing means comprises threads deposed upon said spring loaded plungers threadably engaging threads formed within aperatures extending through said tubular member radially inwardly toward the center of said bore.

3. The prealignment collar of claim 1, wherein said biasing means includes a first pair, a second pair, and a third pair of spring loaded plungers.

4. The prealignment collar of claim 1, including at least three pairs of spring loaded plungers.

5. The prealignment collar of claim 4, wherein each spring loaded plunger is rotated radially with respect to the other.

6. The prealignment collar of claim 1, wherein said biasing means can support and rotably align bar stock of different diameters and different cross-sectional shapes.

7. The prealignment collar of claim 1, wherein said prealignment collar is adapted to be mounted in a tool machine spindle.

8. The prealignment collar of claim 1, wherein said prealignment collar is adapted to be mounted in a bar stock feeder.

9. The prealignment collar of claim 1, wherein said biasing means includes a lock nut threadably enagagable therewith disposed against the surface of said prealignment collar for adjustably holding said biasing means at a selected depth.

10. The prealignment collar of claim 1, wherein said biasing means are positioned apart from one another along the longitudinal axis.

11. The prealignment collar of claim 1, wherein said spring loaded plunger includes a slot for cooperative engagement with a tool.

12. The prealignment collar of claim 1, wherein said spring loaded plunger includes a hexagonal shaped recess for cooperative engagement with a tool.

13. The prealignment collar of claim 1, wherein said spring loaded plunger includes a locking element comprising a polymer.

14. The prealignment collar of claim 1, wherein each pair of spring plungers includes a spring loaded plunger radially spaced apart opposite the other.

15. The prealignment collar of claim 1, wherein said second pair of spring loaded plungers are rotated radially approximately 120 degrees from said first pair, and said third pair of spring loaded plungers are rotated approximately 120 degrees from said second pair of spring loaded plungers.

16. A bar stock prealignment collar, comprising:

a tubular member having a longitudinal bore therethrough;

adjustable biasing means extending through said tubular member radially inwardly toward the center of said bore, said adjustable biasing means comprising at least two pair of spring loaded plungers radially and longitudinally spaced apart;

means for holding said biasing means in cooperative engagement within said tubular member, said biasing means having sufficient resistance when deformed to rotatably urge and support a longitudinal section of bar stock having at least two flat sides in concentric alignment in a desired orientation within said bore; and a removable prealignment bushing cooperatively engaging said bar stock providing general alignment of said bar stock prior to engaging said spring loaded plungers.

17. The prealignment collar of claim 16, wherein said bushing is recessed within a first axially extending interior cylindrical section of said tubular member bore.

18. The prealignment collar of claim 16, wherein said bushing is mounted anterior to and separate from said tubular body.

19. The prealignment collar of claim 17, including means to hold said prealignment bushing within said recess.

20. A bar stock prealignment collar, comprising:

a tubular member having a longitudinal bore therethrough;

adjustable biasing means extending through said tubular member radially inwardly toward the center of said bore, said adjustable biasing means comprising at least a first pair, a second pair and a third pair of spring loaded plungers, each of said pairs having one spring loaded plunger radially spaced apart opposite the other;

means for holding said biasing means in cooperative engagement within said tubular member; and said biasing means having sufficient resistance when deformed to rotatably urge and support a longitudinal section of bar stock having at least two flat sides in concentric alignment in a desired orientation within said bore.

21. The bar stock prealignment collar of claim 20, wherein said means for holding said biasing means comprises threads deposed upon said spring loaded plungers threadably engaging threads formed within apertures extending through said tubular member radially inwardly toward the center of said bore.

22. The bar stock prealignment collar of claim 20, including a prealignment bushing.

23. The prealignment collar of claim 22, wherein said bushing is recessed within a first axially extending interior cylindrical section of said tubular member bore.

24. The prealignment collar of claim 22, wherein said bushing is mounted anterior to and separate from said tubular body.

25. The prealignment collar of claim 20, wherein said biasing means can support and rotatably align bar stock of different diameters and different cross-sectional shapes.

26. The prealignment collar of claim 20, wherein said prealignment collar is adapted to be mounted in a tool machine spindle.

27. The prealignment collar of claim 20, wherein said prealignment collar is adapted to be mounted in a bar stock feeder.

28. The prealignment collar of claim 20, wherein said biasing means includes a lock nut threadably engagable therewith disposed against the surface of said prealignment collar for adjustably holding said biasing means at a selected depth.

29. The prealignment collar of claim 20, wherein said biasing means are positioned apart from one another along the longitudinal axis.

30. The prealignment collar of claim 23, including means to hold said prealignment bushing within said recess.

31. The prealignment collar of claim 20, wherein said spring loaded plunger includes a slot for cooperative engagement with a tool.

32. The prealignment collar of claim 20, wherein said spring loaded plunger includes a hexagonal shaped recess for cooperative engagement with a tool.

33. The prealignment collar of claim 20, wherein said spring loaded plunger includes a locking element comprising a polymer.

34. A bar stock prealignment collar, comprising:

a tubular member having a longitudinal bore therethrough;

adjustable biasing means extending through said tubular member radially inwardly toward the center of said bore, said adjustable biasing means comprising at least a first pair, a second pair and a third pair of spring loaded plungers, said second pair of spring loaded plungers being rotated radially approximately 120 degrees from said first pair of spring loaded plungers, and said third pair of spring loaded plungers being rotated approximately 120 degrees from said second pair of spring loaded plungers;

means for holding said biasing means in cooperative engagement within said tubular member; and said biasing means having sufficient resistance when deformed to rotatably urge and support a longitudinal section of bar stock having at least two flat sides in concentric alignment in a desired orientation within said bore.

35. The bar stock prealignment collar of claim 34, wherein said means for holding said biasing means comprises threads deposed upon said spring loaded plungers threadably engaging threads formed within apertures extending through said tubular member radially inwardly toward the center of said bore.

36. The bar stock prealignment collar of claim 34, including a prealignment bushing.

37. The prealignment collar of claim 36, wherein said bushing is recessed within a first axially extending interior cylindrical section of said tubular member bore.

38. The prealignment collar of claim 36, wherein said bushing is mounted anterior to and separate from said tubular body.

39. The prealignment collar of claim 34, wherein each spring loaded plunger is rotated radially with respect to the other.

40. The prealignment collar of claim 34, wherein said biasing means can support and rotatably align bar stock of different diameters and different cross-sectional shapes.

41. The prealignment collar of claim 34, wherein said prealignment collar is adapted to be mounted in a tool machine spindle.

42. The prealignment collar of claim 34, wherein said prealignment collar is adapted to be mounted in a bar stock feeder.

43. The prealignment collar of claim 34, wherein said biasing means includes a lock nut threadably engagable therewith disposed against the surface of said prealignment collar for adjustably holding said biasing means at a selected depth.

44. The prealignment collar of claim 34, wherein said biasing means are positioned apart from one another along the longitudinal axis.

45. The prealignment collar of claim 37, including means to hold said prealignment bushing within said recess.

46. The prealignment collar of claim 34, wherein said spring loaded plunger includes a slot for cooperative engagement with a tool.

47. The prealignment collar of claim 34, wherein said spring loaded plunger includes a hexagonal shaped recess for cooperative engagement with a tool.

48. The prealignment collar of claim 34, wherein said spring loaded plunger includes a locking element comprising a polymer.

49. The method of prealigning a polygonal cross-sectional shaped bar stock for feeding a collet with a bar stock prealignment collar, comprising the steps of:

feeding polygonal shaped bar stock having points and flats through a prealignment bushing;

guiding said bar stock through a prealignment collar having a bore therethrough and at least a first pair and a second pair of spring loaded biasing means radially and longitudinally spaced apart extending radially inward in the path of said bar stock positioned radially therein;

slidably contacting said spring loaded biasing means extending downward into the path of travel with at least one point of said bar stock depressing said biasing means; and deflecting said point of said bar stock with said biasing means rotatably urging and supporting said bar stock to a selected orientation, said biasing means cooperatively engaging said bar stock flats so that the points of the bar stock do not strike the collet.

\* \* \* \* \*